US005769062A

United States Patent [19]

Antão

[11] Patent Number: 5,769,062
[45] Date of Patent: Jun. 23, 1998

[54] FUEL SYSTEM

[76] Inventor: Gregory Innocencio Xavier Romeo Antão, Wild Geese House, 30A Wings Road, Surrey GU9 OHW, Great Britain

[21] Appl. No.: 656,247
[22] PCT Filed: Dec. 6, 1994
[86] PCT No.: PCT/GB94/02665
§ 371 Date: Jun. 6, 1996
§ 102(e) Date: Jun. 6, 1996
[87] PCT Pub. No.: WO95/16124
PCT Pub. Date: Jun. 15, 1995

[30] Foreign Application Priority Data

Dec. 7, 1993 [GB] United Kingdom .................... 9325030
Feb. 24, 1994 [GB] United Kingdom .................... 9403574

[51] Int. Cl.$^6$ .................................................. F02M 29/02
[52] U.S. Cl. .......................................... 123/590; 123/592
[58] Field of Search ..................... 123/590, 592

[56] References Cited

U.S. PATENT DOCUMENTS

| 1,106,452 | 8/1914 | Ittner | 123/592 |
|---|---|---|---|
| 1,123,876 | 1/1915 | Hiddleson | 123/592 |
| 2,027,480 | 1/1936 | Higley | 123/592 |
| 2,205,750 | 6/1940 | Ross | 123/592 |
| 3,467,072 | 9/1969 | Toesca | 123/590 |
| 3,544,290 | 12/1970 | Larson, Sr. et al. | 123/592 |
| 3,583,377 | 6/1971 | Graziano | 123/590 |
| 3,671,208 | 6/1972 | Medsker | 123/590 |
| 4,359,997 | 11/1982 | Lyssy | 123/592 |
| 4,422,432 | 12/1983 | Knox, Sr. | 123/592 |
| 4,473,057 | 9/1984 | Collins | 123/592 |
| 4,671,247 | 6/1987 | Barbee | 123/592 |
| 5,137,005 | 8/1992 | Kirby | 123/592 |
| 5,343,848 | 9/1994 | Birch et al. | 123/592 |
| 5,590,523 | 1/1997 | Fox | 123/590 |

FOREIGN PATENT DOCUMENTS

| 713742 | 10/1931 | France | 123/592 |
|---|---|---|---|
| 2 470 257 | 5/1981 | France . | |
| 479 892 | 2/1938 | Germany . | |
| 1 576 197 | 5/1970 | Germany . | |
| 389215 | 3/1933 | United Kingdom | 123/592 |
| 1 559 847 | 1/1980 | United Kingdom . | |
| WO 82/01746 | 5/1982 | WIPO . | |

*Primary Examiner*—Erick R. Solis
*Attorney, Agent, or Firm*—Wigman, Cohen, Leitner & Myers, P.C.

[57] ABSTRACT

An injection/mixing device for improving the mixing of fuel and air in a petrol driven internal combustion engine. The device is fitted in the engine inlet manifold close to the fuel inlet from a carburettor or fuel injector and uses a vortex generator. The vortex generator is in the form of an array of lenticular, conical or deltoid disks located in the fuel/air flow and which serve to disperse the impinging fuel droplets and mix the fuel and air. The effect of the device is preferably enhanced by allowing the vortex generator to rotate or spin about its axis. This rotation is achieved by means of a turbine associated with the disks or by means of an external motor. The device may also be connected to a vacuum relief valve to attenuate the level of the depression in the intake manifold under certain conditions. The vacuum relief valve may be integral or separate from the device.

17 Claims, 3 Drawing Sheets

FUEL SYSTEM

BACKGROUND OF THE INVENTION

The present invention relates to improving the combustion efficiency of internal combustion engines and more particularly relates to means for improving the mixing of fuel and oxygen containing gas.

DESCRIPTION OF THE PRIOR ART

In recent years there has been increasing concern over the problems of atmospheric pollution caused by exhaust gases from vehicles and of improving the fuel economy of petrol engines. Any reduction of urban pollution can yield benefits, for example, in the reduction of associated health problems such as asthma and any improvement in vehicle fuel economy can produce significant savings in fuel costs and assist the achievement of more stringent emission requirements.

The depression or vacuum in the intake or inlet manifold of petrol fueled internal combustion engines can increase significantly under certain conditions. These conditions can be decelerative operational modes as well as engine standby modes such as idling when the engine is turning over but the vehicle that it powers is at rest. Under these conditions excess petrol tends to be drawn from the carburettor or fuel injection system into the intake manifold. This excess fuel is, for the most part, passed through the engine without combustion and emerges as unburnt hydrocarbon pollutants in the exhaust emissions. The economic and environmental ramifications of this are readily appreciable.

The use of vacuum relief devices is known for reducing the high depression levels in the intake manifolds of petrol engines. Some devices use piped connections with tapping plugs attached to the walls of the intake manifolds and other devices can also be attached to existing vacuum lines which are themselves attached to the intake manifold. These devices can have certain disadvantages such as propensity to leak before the desired or design depression levels have been reached. Also engines can be damaged by failure of the devices. Also some devices suffer from an inadequate response to changing vacuum levels in the inlet manifold during, for example, stop-start driving conditions especially during urban driving.

The problem of incomplete combustion is also present in other modes of engine operation when the depression levels in the inlet manifold may be at moderate levels or at levels that are consistent with steady operating conditions for the engine. This can be due to incomplete mixing of the fuel and air mixture passed through the inlet manifold into the engine. The present invention is intended to improve engine operating conditions for example by eliminating or alleviating one or more of the foregoing disadvantages.

SUMMARY OF THE INVENTION

Thus, according to the present invention there is provided a device suitable for mixing combustion gases in an internal combustion engine, the device comprising a vortex generator adapted to mix fuel and oxygen containing gas.

In certain applications the injection/mixing device does not require an injection mode and can be used solely as a mixing device. However, the invention preferably comprises a means for allowing passage of ambient atmosphere into the inlet section of the internal combustion engine which most preferably is in the form of an integral injection/mixing device.

The means for fitting the device to the inlet manifold of the internal combustion engine may be for example a screw thread or bayonet fitting.

The vortex generator is preferably one or more plates of lenticular, truncated conical or deltoid configuration. They may be in the form of discs and may be arranged in a parallel array, the plane of the plates being preferably parallel to the gas flow.

The term lenticular is intended to include a lens like or equivalent configuration and may, for example, be in the form of an equi-convex lens, a bi-convex lens or a concave/convex lens.

The device preferably has means for rotating the vortex generator and the means may be, for example, a turbine associated with the vortex generator or an external prime mover such as a motor.

The device may have an integral inlet for connection to a vacuum relief valve.

The invention also includes an internal combustion engine having a device as herein before described. The invention also includes a method of operating an internal combustion engine comprising passing the fuel and oxygen containing gas towards a device as herein before described.

The invention will now be described by way of example only and with reference to FIGS. 1 to 11 of the accompanying drawings.

DESCRIPTION OF THE PREFERRED EMBODIMENTS

Figure 1:
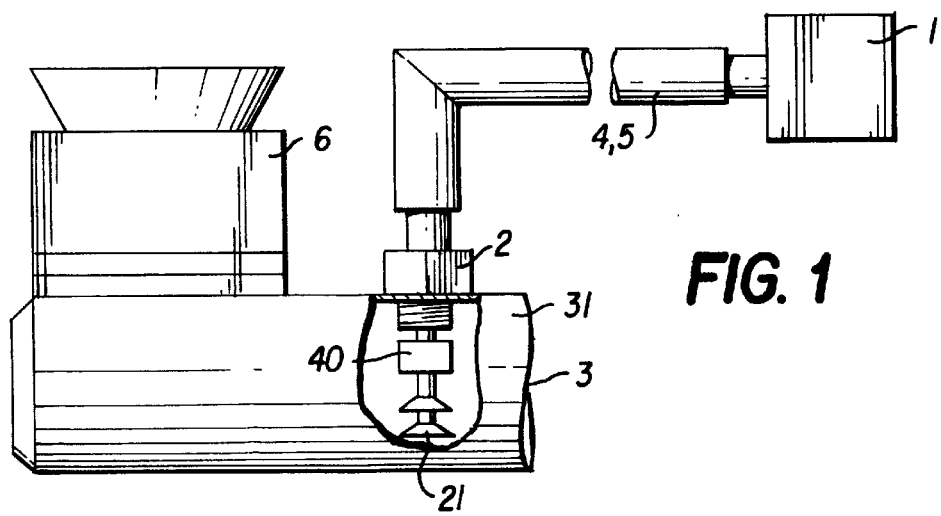
FIG. 1 is a schematic drawing of the inlet section of a petrol driven internal combustion engine fitted with an injection/mixing device.

In FIG. 1 a vacuum relief valve 1 is connected to the injection/mixing device 2 by means of a hose or pipe 4. The injection/mixing device 2 is fitted to the side wall of the inlet manifold 3 of a petrol engine downstream of the carburettor or fuel injection system 6.

The vacuum relief valve 1 is primarily designed to relieve the depression within the inlet manifold under very high vacuum conditions such as decelerative and idling modes of engine operation. The valve 1 is connected to the injection/mixing device 2 or to any convenient vacuum pipe 5 such as a brake servo mechanism or engine breather hose.

The valve 1, in contrast to other valve types, dispenses with the relatively heavier steel ball and spring mechanism which tends to cause a relatively slow response to rapidly changing pressure conditions in the intake manifold. Instead a series of lightweight poppet valves 11 are used and are kept closed by springs 14, with seating force being provided also by the floating valve seats 12, 13. This results in a reduced system inertia with consequent rapid valve opening and closing. These poppet valves have a tendency to unseal or open progressively with increasing vacuum pressures and as a result tend to leak at pressures below the design threshold. This problem is overcome by the use of floating valve seats 12, 13 in which the seats are forced onto the poppets and their respective springs 14 by the suction due to the prevailing vacuum conditions. As the vacuum progressively increases to the design opening condition, the floating valve seats 12, 13 are drawn onto their respective rests 18. Any increase in vacuum pressures then causes the increment in suction forces acting on the seats 12, 13 to be carried by the rests 18. The poppets 11 can now unseat or open at the design vacuum pressures. The relatively lightweight poppets 11 and floating seats 12, 13 have the following advantages: (a) faster poppet valve operating response due to low system inertia (b) improved long term operating reliability as maximum spring forces are generated only under the action of vacuum pressures acting on the floating valve seats which draw the valve seats 12, 13 down onto their poppets 11 and support springs 14 (c) improved control of valve opening at a given vacuum level such that a minimum opening vacuum threshold is reached before the poppet valves unseat or open which is achieved by careful selection of the closing spring stiffness involved and precise adjustment of the valve (d) improved safety and reliability against valve failure due to the poppet valves 11 and their respective seats 12, 13 being located in tandem or series with the nearest poppet valve 11 to the valve outlet 16 having to open first, before the next poppet valve in line can open, i.e., the poppet valves open sequentially. Thus, failure or progressive failure of any one of the poppet valves 11 should not lead to a potentially catastrophic situation. The ability to multiplex the air inlet valves 11 in series in the valve body 17 gives the valve 1 inherent safeguards against failure and (e) by use of the stepped poppet valve 34 (see FIG. 8) relatively low flow rates of air may be introduced into the manifold 3 during engine conditions such as idling. However, when conditions providing quite high manifold vacuum levels such as overrun are encountered quite substantial flow rates of air into the manifold are required. This is provided by the action of the stepped poppet being drawn further down onto its support spring 14 allowing its stepped restrictor 36 to be drawn out of the orifice 37. The stepped poppet valve spherical sealing face 35 also allows for improved sealing performance particularly during conditions of poppet to seat misalignment.

The injection/mixing device may have two functions. Firstly, it has the ability to convey air from the vacuum relief valve 1 under high depression conditions into the inlet manifold and secondly, it facilitates better mixing of the fuel and air drawn into the engine. Preferably, the devices use both functions concurrently which may give a synergistic effect in engine performance. However, it will be appreciated that under some conditions only one or other of the functions will be required. The device is therefore designed to operate in three modes (a) air injection only, (b) mixing only and (c) simultaneous air injection and mixing. The device is configured to operate in these three modes and in the mixing only mode, the vacuum relief valve, if present, is a separate item.

In operating mode (a) the device acts only as a conduit for air into the engine inlet manifold 3 and is connected to valve 1 through a suitable hose or pipe 4. In modes (b) and (c) the operating mode is more complex. The device comprises a vortex generator which is in the form of one or more plates 21. The purpose of the plates is to act as vortex generators or flow splitters which add a rotational component of flow to the air/fuel mixture to ensure better dispersion of the fuel droplets in the inlet manifold 3. The rotational flow ensures that the heavier droplets of petrol, usually concentrated at locations of fastest flow, e.g., the centre of the manifold flow cross-section, are disaggregated and dispersed more evenly by mainly centrifugal forces generated by the effects of vorticity in the fluid.

The use of vortex generators to facilitate complete combustion is known particularly in systems for burning gases such as flare stacks and burners. Their use in the inlet manifolds of petrol engines has not been generally exploited because of the tendency of such devices to impede the flow of the fuel/air mixture into the engine.

The present invention uses vortex generators 21 which have a low blockage effect or flow impedance so that the adverse pressure gradients produced by known systems are minimized. The effects of the vorticity created by the plates 21 could be allowed to diminish downstream of the device 2 so that the ambient flow conditions that exist without the plates prevail albeit with a better dispersion of the petrol droplets so facilitating improved combustion of the fuel. The presence of the plates 21 also facilitates the improved mixing of the injected airstream with the fuel/air mixture already in the manifold 3.

The effect of the vorticity may be greatly amplified by allowing the plate or vortex generator array or spool 22 to spin or rotate about its polar or longitudinal axis. The spinning effect may be introduced by torque from a turbine 40 which could be formed integrally with the array 22. The turbine would derive its motive power from the air/fuel stream along the manifold. Another configuration is the use of a suitable prime mover 41 such as a motor to provide torque to rotate the vortex generator array 22.

Figure 2:
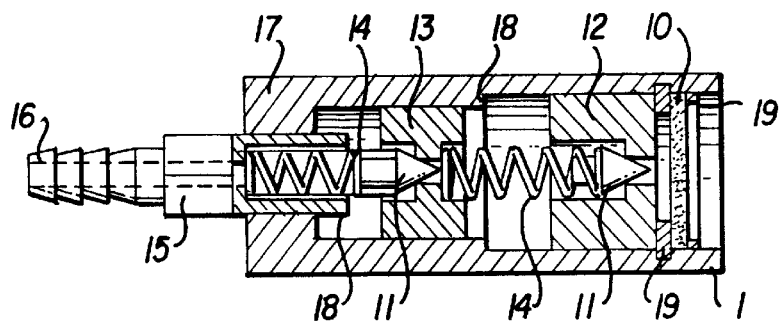
FIG. 2 is a vertical section and part perspective view of a vacuum relief valve suitable for use with the device.
Figure 3:
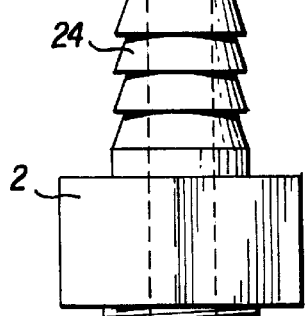
FIG. 3 is a front elevation of one embodiment of an injection/mixing device.
Figure 4:
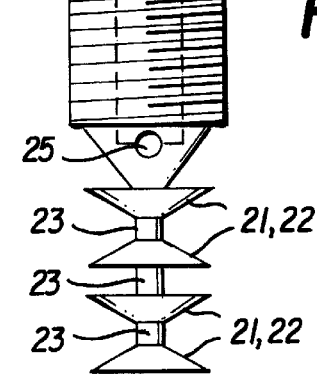
FIG. 4 is a side elevation of an embodiment of a part cut away conical disk for use in an injection/mixing device.
Figure 4:
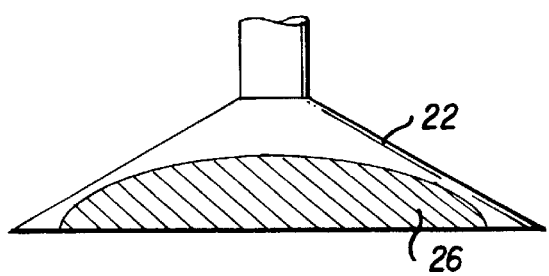
Figure 5:
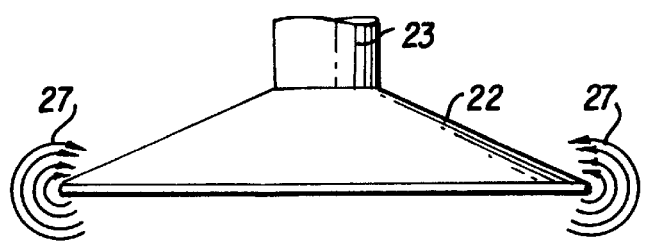
FIG. 5 is a front elevation of a conical disk with an indication of turbulent mixing flow at its edges.
Figure 6:
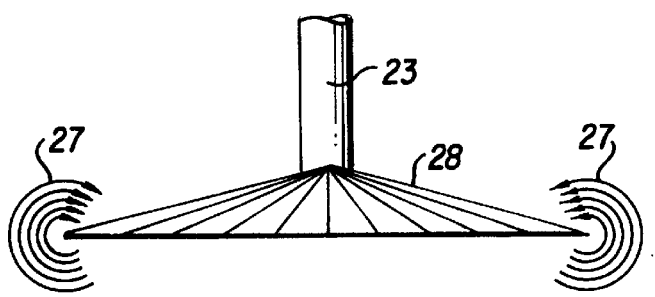
FIG. 6 is a front elevation of a triangular deltoid plate.
Figure 7:
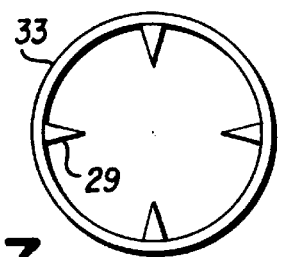
FIG. 7 is a vertical section through an inlet manifold having radial inwardly projecting fins or plates.
Figure 9:
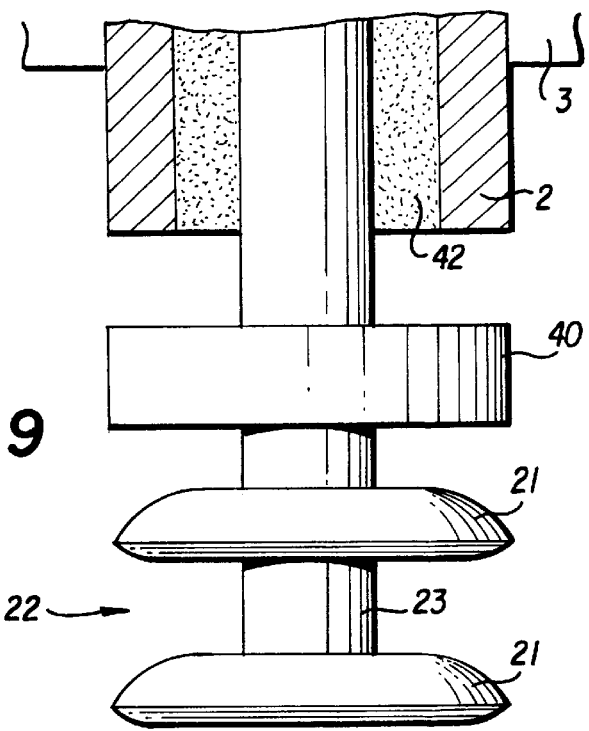
FIG. 9 is a front elevation and part section of an injection/mixing device having a lenticular disk and turbine drive means.
Figure 8:
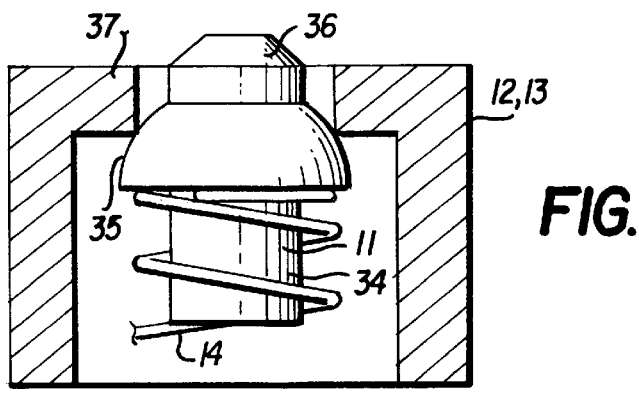
FIG. 8 is a schematic arrangement of a poppet valve inside a floating seat.
Figure 10:
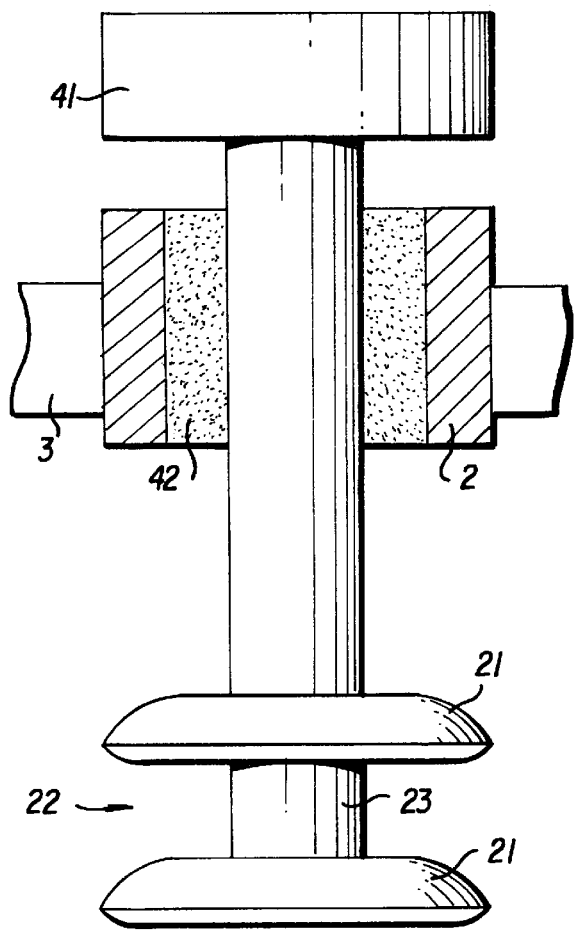
FIG. 10 is a front elevation and part cut away of an injection/mixing device with an external prime mover.
Figure 11:
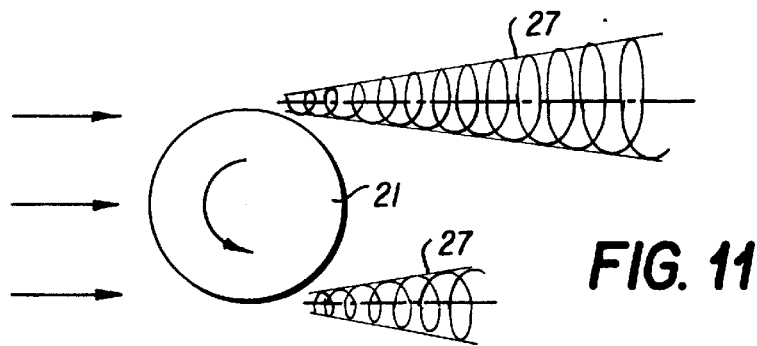
FIG. 11 is a plan view of a lenticular or conical disk showing the tip vortices formed due to incident gas flow and disk rotation.

FIGS. 1 to 11 show specific examples of embodiments of the injection/mixing device. FIG. 1 shows a vacuum relief valve connected to the device 2 by a hose or pipe 4. The device is fixed into the side wall 31 of the inlet manifold 3 of a petrol engine just downstream of the carburettor 6. In FIG. 2, the vacuum relief valve I comprising valve body 17 having two poppet valves 11 mounted in series with their respective floating valve seats 12, 13 and their closing springs 14. Also shown is the valve adjuster 15 with its integral outlet 16. The air filter 10 and the retainers 19 are also shown. In FIG. 3 the device 2 is shown having a vortex generator in the form of a series of circular conical or lenticular discs 22 conjoined by a central pillar or shaft 23. Also shown is the inlet ferrule 24 and the outlet holes 25. FIG. 4 shows a chord wise section through a vortex generator in the form of a conical or lenticular disc 22. The section is taken parallel to the flow stream of the air/fuel mixture in the inlet manifold 3. The section so produced is that of an aerofoil 26 with a highly curved upper surface. FIG. 5 is an example of a conical or lenticular disc 22 located side on to a flow of air/fuel mixture which moves substantially parallel to the surfaces of the discs 22. Due to the high curvature of the upper surface of the disc 22 the airflow above the disc moves faster than the airflow below the disc—the Bernoulli effect. The effect of the conical or lenticular disc in the flow is that of a very low aspect ratio wing with its attendant high vorticity due to the tip losses. The vortices 27 are shown at the edges of the discs 22 and lie in the plane of the drawing. It is these vortices that are used to facilitate mixing of the flow. FIG. 6 shows one of several possible alternative configurations of vortex generator plates 28 with a triangular or delta platform which are slightly inclined to the oncoming flow so as to produce a strong pair of vortices 27. FIG. 7 shows a manifold insert 33 incorporating radial vortex generator elements 29. FIG. 8 shows another possible embodiment of the poppet valve 11 of the vacuum relief valve and its respective floating valve seat 12, 13. This figure shows a stepped poppet valve 34 having a spherical sealing face 35. The effect of the step is to restrict the airflow through the seat 12, 13 at relatively low vacuum levels and to increase the airflow rate when high vacuum levels are experienced. FIG. 9 shows the device 2 having one of a possible series of embodiments of the vortex generator plate arrays 22 shown supported by a bearing 42 which allows the vortex generator spool 22 to spin or rotate due to the torque generated by the turbine 40 which can, if required, be an integral part of the spool 22 as shown or otherwise. FIG. 10 shows one of a possible series of embodiments of the vortex generator plate arrays 22 shown supported by a bearing 42 which facilitates the spinning or rotation of the spool 22 acting under the influence of a suitable prime mover 41 such as a motor. FIG. 11 shows the high induced vortex 27 due to the action of the spinning vortex generator element 21 under the influence of the oncoming flow of the air/fuel mixture.

Referring to FIGS. 1 to 11 showing specific examples of some of the possible embodiments of the invention, the device is fitted into wall 31 of the inlet manifold of a petrol engine. The vacuum relief valve 1 comprises two poppet valves 11 of conical section although other forms of section such as spherical or stepped may be used supported on springs 14 and seated on their respective seats 12, 13. The upper poppet valve 1 bearing onto its seat 12 is supported by its spring 14 which is in turn supported by the valve adjuster 15.

The spring stiffness may be chosen so that the poppet valves 11 can open at differing vacuum pressures. This may also be accomplished by varying the diameters of the apertures in the floating valve seats 12, 13.

In operation, a vacuum pressure applied to the valve outlet 16 by the engine inlet manifold 3 via the device 2 and its connecting pipe 4 will draw down the lower valve seat 13 down onto the lower poppet 1 progressively compressing the lower spring 14. The lower seat 13 will be drawn down until at an appropriate vacuum level it will bear onto its rest 18 at the end of the adjuster 15. As the vacuum level increases the lower poppet 11 gradually unseats at a vacuum pressure at or near the design vacuum level. The lower poppet valve 11 opens so allowing the vacuum pressure to progress to a position above the lower valve seat 13. The vacuum now draws down the upper valve seat 12 onto its own poppet 11 and spring 14 until it is halted by the upper rest 18. The upper poppet valve 11 is now progressively unseated as the vacuum reaches the appropriate design level. This process is very rapid causing the two valves 11 to open in quick succession. It may be seen that the valve closing forces actually increase as the vacuum levels increase, unlike conventional poppet valves, until the floating seats come to their rest positions. Further increases in vacuum levels will cause the poppet valves 11 to open at or near design levels. Air can now be drawn into the valve through the valve inlet 10 and on through the system of poppet valves 11, now open, and through the valve outlet 16 to the manifold 3 via the pipe 4 and the device 2.

The device 2 comprises a tube closed at one end with one or more holes 25 drilled in its wall at the closed end. The device has a ferrule 24 at its open end for connection to the hose or pipe 4 from the vacuum relief valve 1. The body of the injector is fashioned so as to incorporate a male screw thread to facilitate its attachment to the wall 31 of the inlet manifold 3 and is one of a range of options for attachment. The screw portion of the device 2 is located near the closed end of the injector tube just above the outlet holes 25. The outlet holes 25 are located on the tapered portion of the injector body which is located adjacent to the plates or vortex generators 21 which in this example take the appearance of a pair of bobbins or spools in elevation. The vortex generators 21 are made up of one or more conical or lenticular discs 22 conjoined by a central pillar or pylon 23. These serve to break up the oncoming flow of fuel/air mixture in the manifold and to create rotational flow so as to better disperse the petrol droplets throughout the manifold downstream of the device 2. The conical or lenticular discs 22 are used as vortex generators because of their axisymmetricity. This is so that flow may approach the discs 22 from any angle perpendicular to their axis of radial symmetry, as the device is essentially positioned into the manifold wall 31, to obviate any problems of orientation of the vortex generators 21. The conical or lenticular shape of the plates 21 is selected because any chord wise section taken parallel to the flow across the plane of the plate will be seen to be essentially aerofoil shape albeit with a sharp leading edge. This allows the discs 22 to act as very low aspect ratio winglets under the influence of chord wise fluid flows with their attendant tip vortices. These tip vortices are used to spin the oncoming flow so as to facilitate dispersion of the petrol droplets more thoroughly throughout the fuel/air mixture. This leads to more complete combustion with consequently greater efficiency and fewer undesirable pollutants. The plates 22 also assist the dispersal of air injected into the manifold by the action of the vacuum relief valve 1 and also help ensure a more even mixture.

The effect of the vorticity may be greatly amplified by allowing the vortex generator array or spool to spin about its longitudinal or polar axis. The component of velocity obtained due to the rotation of disc 21 is additive to the flow velocity of the fluid at that portion of the vortex generator 21 surface that is going into the oncoming fluid stream. This region of enhanced fluid velocity experiences significantly enhanced vorticity.

If the problem with orientation to the flow were overcome by other means for example, it would also be possible to use other forms of flat plate as vortex generators. One possible configuration is a triangular or delta shaped plate 28, or a plurality of these, fixed with the apex directed into the flow and at a slight angle of incidence to the flow so as to generate the vorticity, shown as vortex pair 27, that is a feature of such a shape. These may be used to effect a more even mixing of fuel and air in the manifold. This configuration, although capable of retrofitting would be more suitably used in new custom built manifold designs which would be designed to cope with the relatively larger plates envisaged and different flow characteristics. Other possible configurations, for example, include manifold inserts formed with one or more vortex generating plates attached to the internal walls in a radial arrangement or similar so as to condition the flow as described hereinbefore.

I claim:

1. A device for mixing combustion gases in an internal combustion engine having an intake manifold with a flow axis comprising a vortex generator disposed in the intake manifold, said vortex generator comprising a circular disk having a disk axis and a generally aerofoil shape in a chordwise cross-section parallel to the disk axis, said disk being disposed in the intake manifold such that the disk axis is substantially perpendicular to the flow axis and to the flow of combustion gases over the disk.

2. The device of claim 1, including means for rotating said disk about its axis.

3. The device of claim 2, wherein said rotating means comprises a prime mover located externally of the intake manifold.

4. The device of claim 2, wherein said rotating means comprises a shaft connected to said disk, means mounting said shaft for rotation and a turbine mounted to said shaft for imparting rotation thereto.

5. The device of claim 4, wherein said turbine is located in said intake manifold and rotates about an axis coincident with the disk axis.

6. The device of claim 1, wherein said disk has a truncated conical shape.

7. The device of claim 1, wherein said disk has a lenticular shape.

8. The device of claim 1, wherein said vortex generator comprises a plurality of said disks.

9. The device of claim 1, wherein said intake manifold has a sidewall, an opening in the sidewall, a shaft extending through the opening in the sidewall, said disk being supported on said shaft in the intake manifold, said disk and shaft being insertable into the intake manifold through the opening in the sidewall whereby the vortex generator may be retrofitted to existing internal combustion engines.

10. The device of claim 9, including means mounted externally of the intake manifold for rotating said shaft and bearing means mounted in said opening for rotatably supporting said shaft.

11. The device of claim 9, including means mounted internally of the intake manifold for rotating said shaft and bearing means mounted in said opening for rotatably supporting said shaft.

12. The device of claim 1, wherein said vortex generator comprises at least two disks having conical shapes, the apices of said conical shapes confronting one another along a common disk axis to form a spool-like member.

13. The device of claim 12, including at least two of said spool-like members disposed in the intake manifold.

14. The device of claim 1, wherein said disk is mounted in the intake manifold in fixed, nonrotating relation thereto.

15. A device for mixing combustion gases in an internal combustion engine having an intake manifold with a flow axis comprising a vortex generator disposed in the intake manifold, said vortex generator comprising a solid disk having a circular periphery and a disk axis, said disk comprising a truncated conical disk having an aerofoil shape in a chordwise cross-section and being disposed in the intake manifold such that the disk axis is substantially normal to the flow axis.

16. A device for mixing combustion gases in an internal combustion engine having an intake manifold with a flow axis comprising a vortex generator disposed in the intake manifold, said vortex generator comprising a solid disk having a circular periphery and a disk axis, said disk comprising an equi-convex lens, a bi-convex concave/convex lens and being disposed in the intake manifold such that the disk axis is substantially normal to the flow axis.

17. A device for mixing combustion gases in an internal combustion engine having an intake manifold with a flow axis comprising a vortex generator disposed in the intake manifold, said vortex generator comprising a solid disk having a circular periphery and a disk axis and being disposed in the intake manifold such that the disk axis is substantially normal to the flow axis, said intake manifold having a sidewall, said disk being mounted on a shaft extending through the sidewall of the intake manifold, said shaft being rotatably supported on said intake manifold and means connected to said shaft for rotating the same.

* * * * *

UNITED STATES PATENT AND TRADEMARK OFFICE
CERTIFICATE OF CORRECTION

PATENT NO.   : 5,769,062
DATED        : June 23, 1998
INVENTOR(S)  : Gregory I. Antao It is certified that error appears in the above-identified patent and that said Letters Patent is hereby corrected as shown below:

IN THE CLAIMS:

Col. 8, line 25 (Claim 16), after "bi-convex"

insert --lens or a--.

Signed and Sealed this

Twentieth Day of April, 1999

Attest:

Q. TODD DICKINSON

Attesting Officer      Acting Commissioner of Patents and Trademarks